United States Patent
Deng et al.

(10) Patent No.: US 11,952,312 B2
(45) Date of Patent: Apr. 9, 2024

(54) LOW-MODULUS ION-EXCHANGEABLE GLASSES FOR ENHANCED MANUFACTURABILITY

(71) Applicant: CORNING INCORPORATED, Corning, NY (US)

(72) Inventors: Binghui Deng, Painted Post, NY (US); Xiaoju Guo, Pittsford, NY (US); Peter Joseph Lezzi, Corning, NY (US)

(73) Assignee: Corning Incorporated, Corning, NY (US)

( * ) Notice: Subject to any disclaimer, the term of this patent is extended or adjusted under 35 U.S.C. 154(b) by 158 days.

(21) Appl. No.: 17/591,060

(22) Filed: Feb. 2, 2022

(65) Prior Publication Data

US 2022/0242774 A1    Aug. 4, 2022

Related U.S. Application Data

(60) Provisional application No. 63/145,655, filed on Feb. 4, 2021.

(51) Int. Cl.
| | |
|---|---|
| *B32B 15/04* | (2006.01) |
| *B32B 17/06* | (2006.01) |
| *C03C 3/087* | (2006.01) |
| *C03C 4/18* | (2006.01) |
| *C03C 21/00* | (2006.01) |

(52) U.S. Cl.
CPC ............. *C03C 3/087* (2013.01); *C03C 4/18* (2013.01); *C03C 21/002* (2013.01); *C03C 2204/00* (2013.01)

(58) Field of Classification Search
CPC .................................................. C03C 21/002
USPC ............................................................ 428/426
See application file for complete search history.

(56) References Cited

U.S. PATENT DOCUMENTS

| | | | |
|---|---|---|---|
| 8,854,623 | B2 | 10/2014 | Fontaine et al. |
| 9,290,413 | B2 | 3/2016 | Dejneka et al. |
| 9,670,088 | B2 | 6/2017 | Gomez et al. |
| 9,701,580 | B2 * | 7/2017 | Smedskjaer ............ C03C 3/091 |
| 9,714,192 | B2 | 7/2017 | Ellison et al. |

(Continued)

FOREIGN PATENT DOCUMENTS

| | | |
|---|---|---|
| WO | 2015/116649 A1 | 8/2015 |
| WO | 2020/028284 A1 | 2/2020 |

OTHER PUBLICATIONS

International Search Report and Written Opinion of the International Searching Authority; PCT/US2022/014513; dated May 17, 2022, 11 pages; European Patent Office.

(Continued)

*Primary Examiner* — Lauren R Colgan
(74) *Attorney, Agent, or Firm* — Jeffrey A. Schmidt

(57) ABSTRACT

Glass compositions are provided with low Young's modulus and compatibility with slot drawing techniques, due at least in part to liquidus viscosity and liquidus temperature. When ion-exchanged the resulting glass articles are capable of exhibiting a ratio of a peak compressive stress value in MPa to a Young's modulus value in GPa of 13.0 or more. The glass articles may have a peak compressive stress value in a range of 850 MPa to 1400 MPa. The glass articles are suitable for various high-strength applications, including (Continued)

cover glass applications that experience significant bending stresses during use, for example, cover glasses for flexible displays.

14 Claims, 3 Drawing Sheets

(56) References Cited

U.S. PATENT DOCUMENTS

| | | | |
|---|---|---|---|
| 10,125,044 B2* | 11/2018 | Gross | C03C 3/097 |
| 10,173,923 B2 | 1/2019 | Kawamoto et al. | |
| 2011/0045961 A1 | 2/2011 | Dejneka et al. | |
| 2012/0052275 A1* | 3/2012 | Hashimoto | C03C 3/087 |
| | | | 501/67 |
| 2012/0083401 A1 | 4/2012 | Koyama et al. | |
| 2013/0004758 A1* | 1/2013 | Dejneka | C03C 3/087 |
| | | | 428/220 |
| 2014/0050911 A1 | 2/2014 | Mauro et al. | |
| 2015/0132579 A1 | 5/2015 | Guo et al. | |
| 2015/0140325 A1* | 5/2015 | Gross | C03C 21/002 |
| | | | 428/428 |
| 2015/0246846 A1* | 9/2015 | Choju | C03C 3/091 |
| | | | 428/34.4 |
| 2016/0207823 A1 | 7/2016 | Ping et al. | |
| 2017/0320769 A1 | 11/2017 | Guo et al. | |
| 2019/0012514 A1 | 1/2019 | Jin et al. | |
| 2021/0179482 A1 | 6/2021 | Lezzi et al. | |
| 2021/0269353 A1 | 9/2021 | Gross | |

OTHER PUBLICATIONS

ASTM C336-71(2015), "Standard Test Method for Annealing Point and Strain Point of Glass by Fiber Elongation".
ASTM C338-93(2013), "Standard Test Method for Softening Point of Glass".
ASTM C693-93(2013), "Standard Test Method for Density of Glass by Buoyancy".
ASTM C829-81 (2015), titled "Standard Practice for Measurement of Liquidus Temperature of Glass by the Gradient Furnace Method."
ASTM C965-96 (2012), titled "Standard Practice for Measuring Viscosity of Glass Above the Softening Point".
ASTM E2001-13, titled "Standard Guide for Resonant Ultrasound Spectroscopy for Defect Detection in Both Metallic and Non-metallic Parts.".
ASTM E228, "Standard Test Method for Linear Thermal Expansion of Solid Materials With a Push-Rod Dilatometer".
ASTM standard C770-16, entitled "Standard Test Method for Measurement of Glass Stress-Optical Coefficient,".
Schairer et al., "The nature of residual liquids from crystallization, with data on the system nepheline-diopside-silica", American Journal of Science, vol. 258, 1960, pp. 273-283.

* cited by examiner

LOW-MODULUS ION-EXCHANGEABLE GLASSES FOR ENHANCED MANUFACTURABILITY

This application claims the benefit of priority of U.S. Provisional Application Ser. No. 63/145,655 filed on Feb. 4, 2021 the content of which is relied upon and incorporated herein by reference in its entirety.

FIELD

The present disclosure relates to ion-exchangeable glass compositions. Specifically, embodiments described herein relate to ion-exchangeable glass compositions for use in various industries, for example, consumer electronics, transportation, architecture, defense, medicine, and packaging. Even more specifically, the present disclosure relates to glass compositions for cover glass applications, for example, cover glass for a flexible display.

BACKGROUND

Many consumer products, for example smart phones, tablets, portable media players, personal computers, and cameras, incorporate cover glasses that may function as display covers, and may incorporate touch functionality. Frequently, these devices are dropped by users onto hard surfaces, which can cause damage to the cover glasses, and may negatively impact the use of the devices, for example, the touch functionality may be compromised.

Foldable or flexible displays for consumer electronics applications may benefit from thin, flexible ion-exchanged glass. Glass can be made more resistant to flexure failure through ion-exchange processes, which involve inducing compressive stresses on the glass surfaces. The compressive stress introduced using an ion-exchange process serves to, among other things, arrest flaws that can cause failure of the glass.

Therefore, a continuing need exists for ion-exchangeable glass compositions having desirable mechanical properties for use in a variety of applications, including flexible and/or foldable cover glass applications.

SUMMARY

The present disclosure is directed to ion-exchangeable glass compositions having suitable strength and flexibility for various applications, for example cover glass applications for flexible and/or foldable displays, that have liquidus properties that allow for improved manufacturability.

According to aspect (1), a glass is provided. The glass comprises: greater than or equal to 68.5 mol % to less than or equal to 69.5 mol % $SiO_2$; greater than or equal to 10.0 mol % to less than or equal to 10.5 mol % $Al_2O_3$; greater than or equal to 4.05 mol % to less than or equal to 5.25 mol % MgO; greater than or equal to 0.04 mol % to less than or equal to 1.1 mol % CaO; greater than or equal to 14.5 mol % to less than or equal to 15.8 mol % $Na_2O$; and greater than or equal to 0.1 mol % to less than or equal to 0.2 mol % $SnO_2$.

According to aspect (2), the glass of aspect (1) is provided, wherein the glass is substantially free of $Li_2O$.

According to aspect (3), the glass of any of aspect (1) to the preceding aspect is provided, wherein the glass is substantially free of $K_2O$.

According to aspect (4), the glass of any of aspect (1) to the preceding aspect is provided, wherein the glass is substantially free of ZnO.

According to aspect (5), the glass of any of aspect (1) to the preceding aspect is provided, wherein the glass is substantially free of SrO.

According to aspect (6), the glass of any of aspect (1) to the preceding aspect is provided, wherein the glass is substantially free of BaO.

According to aspect (7), the glass of any of aspect (1) to the preceding aspect is provided, wherein the glass is substantially free of $B_2O_3$.

According to aspect (8), the glass of any of aspect (1) to the preceding aspect is provided, wherein the glass is substantially free of $P_2O_5$.

According to aspect (9), the glass of any of aspect (1) to the preceding aspect is provided, wherein the glass is substantially free of $Fe_2O_3$.

According to aspect (10), the glass of any of aspect (1) to the preceding aspect is provided, wherein the glass comprises: greater than or equal to 68.80 mol % to less than or equal to 69.23 mol % $SiO_2$; greater than or equal to 10.01 mol % to less than or equal to 10.32 mol % $Al_2O_3$; greater than or equal to 4.35 mol % to less than or equal to 5.17 mol % MgO; greater than or equal to 0.04 mol % to less than or equal to 1.03 mol % CaO; greater than or equal to 14.91 mol % to less than or equal to 15.56 mol % $Na_2O$; and greater than or equal to 0.18 mol % to less than or equal to 0.19 mol % $SnO_2$.

According to aspect (11), the glass of any of aspect (1) to the preceding aspect is provided, wherein: $Al_2O_3$+MgO+CaO≥15 mol %.

According to aspect (12), the glass of any of aspect (1) to the preceding aspect is provided, wherein the glass has a liquidus viscosity greater than or equal to 1200 kP.

According to aspect (13), the glass of any of aspect (1) to the preceding aspect is provided, wherein the glass has a liquidus viscosity greater than or equal to 1200 kP to less than or equal to 4000 kP.

According to aspect (14), the glass of any of aspect (1) to the preceding aspect is provided, wherein the glass has a liquidus temperature less than or equal to 1000° C.

According to aspect (15), the glass of any of aspect (1) to the preceding aspect is provided, wherein the glass has a liquidus temperature greater than or equal to 800° C. to less than or equal to 1000° C.

According to aspect (16), the glass of any of aspect (1) to the preceding aspect is provided, wherein the glass has a Young's modulus less than or equal to 72 GPa.

According to aspect (17), the glass of any of aspect (1) to the preceding aspect is provided, wherein the glass has a Young's modulus greater than or equal to 70 GPa to less than or equal to 72 GPa.

According to aspect (18), a glass article is provided. The glass article comprises the glass of any of aspect (1) to the preceding aspect, wherein the glass article has a thickness of less than or equal to 4 mm.

According to aspect (19), the glass article of aspect (18) is provided, wherein the thickness is greater than or equal to 15 μm to less than or equal to 200 μm.

According aspect (20), a glass article is provided. The glass article comprises: a compressive stress layer extending from a surface of the glass article to a depth of compression, the compressive stress layer comprising a peak compressive stress value measured in MPa, wherein the glass article is formed by ion exchanging a glass substrate comprising the glass of any of aspects (1) to (17).

According to aspect (21), the glass article of aspect (20) is provided, wherein a ratio of the peak compressive stress value to a Young's modulus value measured in GPa of the glass substrate prior to ion exchange is greater than or equal to 13.0.

According aspect (22), a glass article is provided. The glass article comprises: a compressive stress layer extending from a surface of the glass article to a depth of compression, the compressive stress layer comprising a peak compressive stress value measured in MPa, a composition at a center of the glass article comprising: greater than or equal to 68.5 mol % to less than or equal to 69.5 mol % $SiO_2$; greater than or equal to 10.0 mol % to less than or equal to 10.5 mol % $Al_2O_3$; greater than or equal to 4.05 mol % to less than or equal to 5.25 mol % MgO; greater than or equal to 0.04 mol % to less than or equal to 1.1 mol % CaO; greater than or equal to 14.5 mol % to less than or equal to 15.8 mol % $Na_2O$; and greater than or equal to 0.1 mol % to less than or equal to 0.2 mol % $SnO_2$.

According to aspect (23), the glass article of aspect (22) is provided, wherein a ratio of the peak compressive stress value to a Young's modulus value measured in GPa is greater than or equal to 13.0, and the Young's modulus value is the Young's modulus of a glass having the same composition as the center of the glass article.

According to aspect (24), the glass article of aspect (21) or (23) is provided, wherein the ratio of the peak compressive stress value to the Young's modulus value is less than or equal to 18.0.

According to aspect (25), the glass article of any of aspect (20) to the preceding aspect is provided, wherein the depth of compression is greater than or equal to 5 µm.

According to aspect (26), the glass article of any of aspect (20) to the preceding aspect is provided, wherein the depth of compression is greater than or equal to 5 µm to less than or equal to 40 µm.

According to aspect (27), the glass article of any of aspect (20) to the preceding aspect is provided, wherein the depth of compression is greater than or equal to 20 µm.

According to aspect (28), the glass article of any of aspect (20) to the preceding aspect is provided, wherein the depth of compression is greater than or equal to 20 µm to less than or equal to 40 µm.

According to aspect (29), the glass article of any of aspect (20) to the preceding aspect is provided, wherein the depth of compression is in a range of 5% to 20% of a thickness of the glass article.

According to aspect (30), the glass article of any of aspect (20) to the preceding aspect is provided, wherein the peak compressive stress value is greater than or equal to 850 MPa to less than or equal to 1400 MPa.

According to aspect (31), the glass article of any of aspect (20) to the preceding aspect is provided, wherein the peak compressive stress value is greater than or equal to 900 MPa.

According to aspect (32), the glass article of any of aspect (20) to the preceding aspect is provided, wherein the glass article has a thickness of less than or equal to 4 mm.

According to aspect (33), the glass article of any of aspect (20) to the preceding aspect is provided, wherein the glass article has a thickness of greater than or equal to 15 µm to less than or equal to 200 µm.

According to aspect (34), a method is provided. The method comprises: contacting a glass substrate with an ion exchange medium to form a glass article comprising a compressive stress layer extending from a surface of the glass article to a depth of compression, wherein the glass substrate comprises the glass of any of claims 1 to 17, and the compressive stress layer comprises a peak compressive stress value measured in MPa.

According to aspect (35), the method of aspect (34) is provided, wherein a ratio of the peak compressive stress value to a Young's modulus value measured in GPa of the glass substrate prior to ion exchange is greater than or equal to 13.0.

According to aspect (36), the method of aspect (35) is provided, wherein the ratio of the peak compressive stress value to the Young's modulus value is less than or equal to 18.0.

According to aspect (37), the method of any of aspect (34) to the preceding aspect is provided, wherein the ion exchange medium comprises greater than or equal to 50 wt % of a potassium salt.

According to aspect (38), the method of any of aspect (34) to the preceding aspect is provided, wherein the ion exchange medium comprises $KNO_3$.

According to aspect (39), the method of any of aspect (34) to the preceding aspect is provided, wherein the contacting extends for a time period of greater than or equal to 1 hour to less than or equal to 24 hours.

According to aspect (40), the method of any of aspect (34) to the preceding aspect is provided, wherein the contacting extends for a time period of greater than or equal to 1 hour to less than or equal to 8 hours.

According to aspect (41), the method of any of aspect (34) to the preceding aspect is provided, wherein the ion exchange medium is at a temperature of greater than or equal to 350° C. to less than or equal to 480° C.

According to aspect (42), the method of any of aspect (34) to the preceding aspect is provided, further comprising etching the glass article.

According to aspect (43), the method of any of aspect (34) to the preceding aspect is provided, wherein the depth of compression is greater than or equal to 5 µm.

According to aspect (44), the method of any of aspect (34) to the preceding aspect is provided, wherein the depth of compression is greater than or equal to 5 µm to less than or equal to 40 µm.

According to aspect (45), the method of any of aspect (34) to the preceding aspect is provided, wherein the depth of compression is greater than or equal to 20 µm.

According to aspect (46), the method of any of aspect (34) to the preceding aspect is provided, wherein the depth of compression is greater than or equal to 20 µm to less than or equal to 40 µm.

According to aspect (47), the method of any of aspect (34) to the preceding aspect is provided, wherein the depth of compression is in a range of 5% to 20% of a thickness of the glass article.

According to aspect (48), the method of any of aspect (34) to the preceding aspect is provided, wherein the peak compressive stress value is greater than or equal to 850 MPa to less than or equal to 1400 MPa.

According to aspect (49), the method of any of aspect (34) to the preceding aspect is provided, wherein the peak compressive stress value is greater than or equal to 900 MPa.

According to aspect (50), the method of any of aspect (34) to the preceding aspect is provided, wherein the glass article has a thickness of less than or equal to 4 mm.

According to aspect (51), the method of any of aspect (34) to the preceding aspect is provided, wherein the glass article has a thickness of greater than or equal to 15 µm to less than or equal to 200 µm.

According to aspect (52), an electronic device is provided. The electronic device comprises: an electronic display; and the glass article of any of aspect (18) to (33) disposed over the electronic display.

According to aspect (53), the electronic device of aspect (52) is provided, further comprising: a housing comprising a front surface, a back surface, and side surfaces; and electrical components disposed at least partially within the housing, the electrical components comprising a controller, a memory, and the electronic display, wherein the electronic display is disposed at or adjacent to the front surface of the housing, and the glass article forms at least a portion of the housing.

BRIEF DESCRIPTION OF THE DRAWINGS

The accompanying figures, which are incorporated herein, form part of the specification and illustrate embodiments of the present disclosure. Together with the description, the figures further serve to explain the principles of and to enable a person skilled in the relevant art(s) to make and use the disclosed embodiments. These figures are intended to be illustrative, not limiting. Although the disclosure is generally described in the context of these embodiments, it should be understood that it is not intended to limit the scope of the disclosure to these particular embodiments. In the drawings, like reference numbers indicate identical or functionally similar elements.

DETAILED DESCRIPTION

Figure 1:
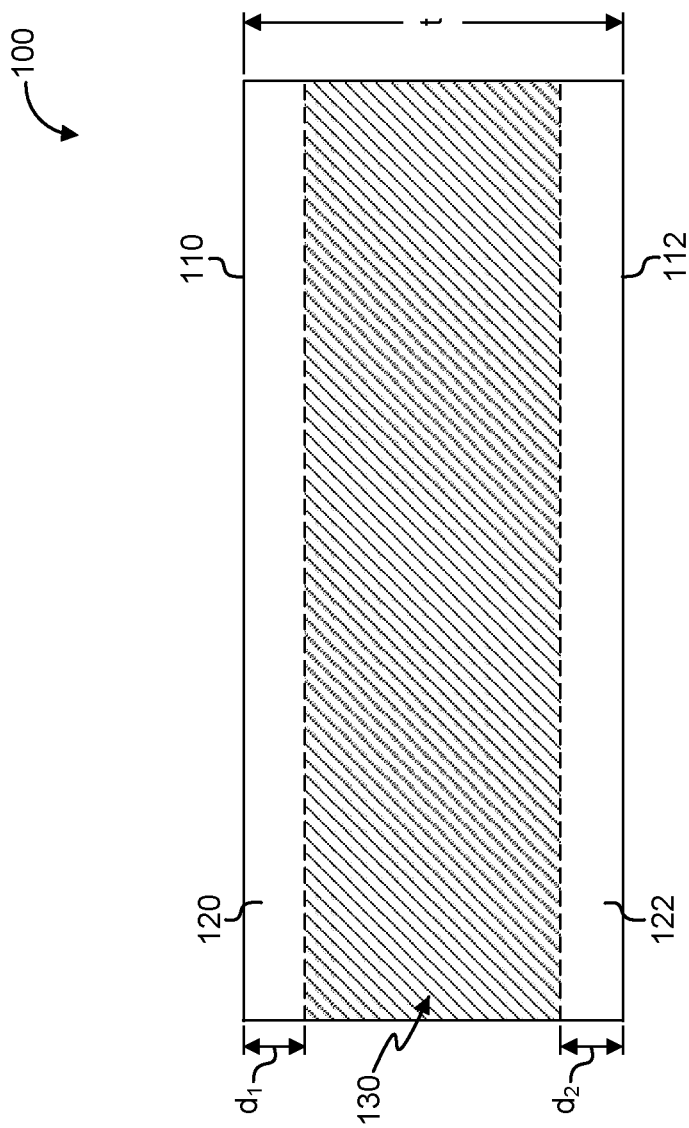
FIG. 1 illustrates a cross section of a glass article having compressive stress regions according to some embodiments.

The following embodiments and examples are illustrative, but not limiting, of the present disclosure. Other suitable modifications and adaptations of the variety of conditions and parameters normally encountered in the field, and which would be apparent to those skilled in the art, are within the spirit and scope of the disclosure.

Glasses described herein are a family of ion-exchangeable alkali aluminosilicate glasses that may be ion-exchanged to achieve high peak compressive stress. As used herein, "ion-exchangeable" means that a glass composition, or glass article comprising the composition, is capable of exchanging first cations located at or near the surface of the substrate with second cations of the same valence. The first ions may be ions of sodium. The second ions may be ions of one of potassium, rubidium, and cesium, with the proviso that the second ion has an ionic radius greater than the ionic radius of the first ion. The first ion is present in the glass-based substrate as an oxide thereof (e.g., $Na_2O$). As used herein, "ion-exchanged glass" or "chemically strengthened glass" means the glass has been subject to at least one ion-exchange process that exchanges cations located at or near the surface of the glass with cations of the same valence.

Glass compositions described herein can be ion-exchanged to achieve a high peak compressive stress. In some embodiments, the glasses described herein may be ion-exchanged to achieve a peak compressive stress of about 900 MPa or more, and up to about 1400 MPa. High peak compressive stress imparted during an ion-exchange process can provide high strength for glasses with shallow flaw size distributions, thereby preventing failure during bending. The high peak compressive stress allows the glass to retain net compression and thus contain surface flaws when the glass is subjected to bending around a tight radius. Glasses according to embodiments described herein have low Young's moduli, which results in lower bending stress values during bending, and can thus prevent failure during a bending event.

In addition, glass compositions described herein have a ratio of peak compressive stress value to Young's modulus value (peak compressive stress value/Young's modulus value, CS/E, where CS is in MPa and E is in GPa) of 13.0 or more across a broad depth of compression range for compressive regions created by an ion-exchange process. Increasing this ratio is difficult because surface compressive stresses imparted during an ion-exchange process can be strongly influenced by Young's modulus in that a higher Young's modulus is a common path to improving compressive stress. That is, Young's modulus is a measure of the stiffness of the network. For example: exchanging a $K^+$ ion into a $Na^+$ site gives compressive stress, but as the network becomes stiffer (as by increasing Young's modulus) then the dilatational stress is higher. Therefore, one common way to achieve a higher CS is to increase the Young's modulus of the glass subjected to ion exchange. By contrast, the glass compositions described herein are capable of achieving a high CS while maintaining a low Young's modulus. A high CS/E ratio allows the glass articles formed from the glass compositions to remain flexible even after ion-exchange. Glass compositions described herein have a low enough Young's modulus before ion-exchange and the value of compressive stress that can be imparted during an ion-exchange process is high enough to achieve a high CS/E ratio across a broad depth of compression range. This results in glass compositions that are flexible and also are capable of high peak compressive stress values. The glass compositions are able to accept high surface compressive stresses at large depths of compression, for example depths as high as 50 µm, at least in part because the compositions resist stress relaxation that can occur during an ion-exchange process. Stress relaxation, which can be more pronounced with elevated temperature and time, is apt to occur during ion-exchange processes designed to impart high depths of compression. These characteristics of the glass compositions described herein make them suitable for various industrial applications, including high-strength cover glass applications that experience significant bending stresses in use, for example, as cover glass in flexible and foldable displays.

As used herein, "peak compressive stress" refers to the highest compressive stress (CS) value measured within a compressive stress region. In some embodiments, the peak compressive stress is located at the surface of the glass. In other embodiments, the peak compressive stress may occur at a depth below the surface, giving the compressive stress profile the appearance of a "buried peak." Unless specified otherwise, compressive stress (including surface CS) is measured by surface stress meter (FSM) using commercially available instruments for example the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient."

As used herein, "depth of compression" (DOC) refers to the depth at which the stress within the glass article changes from compressive to tensile. At the DOC, the stress crosses from a compressive stress to a tensile stress and thus exhibits a stress value of zero. Depth of compression and depth of layer may be measured by a surface stress meter, for example, a FSM-6000 surface stress meter. As used herein, "depth of layer" (DOL) refers to the depth within a glass article at which an ion of a metal oxide diffuses into the glass article where the concentration of the ion reaches a minimum value. In embodiments where only potassium is ion-exchanged into a glass article, DOC may equal DOL. Unless specified otherwise herein, DOC and DOL are considered to be equivalent.

Glass compositions described herein can also be manufactured at reasonable cost. The glass compositions exhibit liquidus temperatures and liquidus viscosities suitable for certain manufacturing techniques, for example slot forming. These thermal properties can increase ease of manufacturing glass articles made from the compositions, which can reduce cost. Glass compositions described in this disclosure have, among other things, an aluminum oxide content and a magnesium oxide content that aid in achieving the desired liquidus viscosity and temperature. In embodiments, the glass compositions can have a liquidus viscosity greater than or equal to 1200 kP (kiloPoise).

Glass compositions described herein can provide one or more of the following benefits. (1) The compositions are capable of achieving high compressive stress values during ion-exchange at small depths of layer (DOL) even without the inclusion of lithium. (2) The compositions have a low modulus, which facilitates higher CS/E ratios and improves bendability for thin foldable applications. (3) Raw materials to make these glasses are cheap and readily available. (4) The compositions have a high per-modifier content, which allows for easier melting. A "per-modifier" content for a glass composition means that the value for ($R_2O$ mol %+RO mol %-$Al_2O_3$ mol %) is greater than 0 mol %, where $R_2O$ mol % is the total mol % of all alkali metal oxides in the composition and where RO mol % is the total mol % of all alkali earth metal oxides in the composition. (5) The compositions have liquidus temperatures and liquidus viscosities which are beneficial for slot forming.

The glass compositions described herein are capable of exhibiting performance comparable to existing glasses utilized for chemically strengthened applications subject to significant bending stresses, such as flexible and/or foldable applications, while also being capable of being formed utilizing slot drawing techniques. The compatibility with slot drawing techniques is a function of at least the relatively high liquidus viscosity of the glass compositions, greater than about 1200 kP, when compared to glass compositions utilized in similar applications. Stated differently, the glass compositions described herein provide the desirable performance of existing bendable chemically strengthened glass articles while having improved manufacturability. The glass compositions described herein are alkali aluminosilicates that have a limited MgO content and contain CaO.

As used herein, the term "glass article" is meant to include any material made at least partially of glass.

For glass compositions described herein, the concentration of constituent components (e.g., $SiO_2$, $Al_2O_3$, $Na_2O$, and the like) are given in mole percent (mol %) on an oxide basis, unless otherwise specified. Components of the glass compositions according to embodiments are discussed individually below. It should be understood that any of the variously recited ranges of one component may be individually combined with any of the variously recited ranges for any other component. As used herein, a trailing 0 in a number is intended to represent a significant digit for that number. For example, the number "1.0" includes two significant digits, and the number "1.00" includes three significant digits.

$SiO_2$ may be the largest constituent in the glass composition and, as such, is the primary constituent of the glass network formed from the glass composition. Pure $SiO_2$ has a relatively low coefficient of thermal expansion (CTE—as used herein this property is measured at a temperature from 0° C. to 300° C.) and is alkali free. However, pure $SiO_2$ has a high melting point. Accordingly, if the concentration of $SiO_2$ in the glass composition is too high, the formability of the glass composition may be diminished as higher concentrations of $SiO_2$ increase the difficulty of melting the glass, which, in turn, adversely impacts the formability of the glass.

In embodiments, the glass composition may include $SiO_2$ in an amount from greater than or equal to 68.5 mol % to less than or equal to 69.5 mol %, such as greater than or equal to 68.6 mol % to less than or equal to 69.4 mol %, greater than or equal to 68.7 mol % to less than or equal to 69.3 mol %, greater than or equal to 68.8 mol % to less than or equal to 69.2 mol %, greater than or equal to 68.9 mol % to less than or equal to 69.1 mol %, greater than or equal to 69.0 mol % to less than or equal to 69.5 mol %, and any and all ranges formed from any of the foregoing values. In embodiments, the glass composition may include $SiO_2$ in an amount from greater than or equal to 68.80 mol % to less than or equal to 69.23 mol %.

Glass compositions disclosed herein include $Al_2O_3$. The addition of $Al_2O_3$ may serve as a glass network former. Furthermore, when the concentration of $Al_2O_3$ is balanced against the concentration of $SiO_2$ and the concentration of alkali oxides in the composition, it may reduce the liquidus temperature of the glass melt.

In embodiments, the glass composition may include $Al_2O_3$ in an amount from greater than or equal to 10.0 mol % to less than or equal to 10.5 mol %, such as greater than or equal to 10.1 mol % to less than or equal to 10.4 mol %, greater than or equal to 10.2 mol % to less than or equal to 10.3 mol %, and any and all ranges formed from any of the foregoing values. In embodiments, the glass composition may include $Al_2O_3$ in an amount from greater than or equal to 10.01 mol % to less than or equal to 10.32 mol %.

In embodiments, the total amount of $Al_2O_3$, MgO, and CaO in the glass composition may be greater than or equal to 15 mol %, such as greater than or equal to 15.0 mol %, greater than or equal to 15.1 mol %, greater than or equal to 15.2 mol %, greater than or equal to 15.3 mol %, greater than or equal to 15.4 mol %, greater than or equal to 15.5 mol %, greater than or equal to 15.6 mol %, greater than or equal to 15.7 mol %. In embodiments, the total amount of $Al_2O_3$, MgO, and CaO in the glass composition may be from greater than or equal to 15.0 mol % to less than or equal to 15.8 mol %, such as from greater than or equal to 15.1 mol % to less than or equal to 15.7 mol %, from greater than or equal to 15.2 mol % to less than or equal to 15.6 mol %, from greater than or equal to 15.3 mol % to less than or equal to 15.5 mol %, from greater than or equal to 15.0 mol % to less than or equal to 15.4 mol %, and any and all ranges formed from any of the foregoing values.

The $Al_2O_3$+MgO+CaO values described above benefit the glass compositions disclosed herein. The $Al_2O_3$+MgO+CaO values as described above contribute to the ability of the glass compositions to achieve the high peak compressive stresses across a broad depth of compression range.

The glass compositions described herein include $Na_2O$. $Na_2O$ may aid in the ion-exchangeability of the glass composition, and improve the formability, and thereby manufacturability, of the glass composition. However, if too much $Na_2O$ is added to the glass composition, the CTE may be too low, and the melting point may be too high.

In embodiments, the glass composition may include $Na_2O$ in an amount from greater than or equal to 14.5 mol % to less than or equal to 15.8 mol %, such as greater than or equal to 14.6 mol % to less than or equal to 15.7 mol %, greater than or equal to 14.7 mol % to less than or equal to 15.6 mol %, greater than or equal to 14.8 mol % to less than or equal to 15.5 mol %, greater than or equal to 14.9 mol % to less than or equal to 15.4 mol %, greater than or equal to 15.0 mol % to less than or equal to 15.3 mol %, greater than or equal to 15.1 mol % to less than or equal to 15.2 mol %, and any and all ranges formed from any of the foregoing values. In embodiments, the glass composition may include $Na_2O$ in an amount of 15 mol % or more, 15.5 mol % or more, 16 mol % or more, 16.5 mol % or more, 17 mol % or more, 17.5 mol % or more, or 18 mol %. In embodiments, the glass composition may include $Na_2O$ in an amount from greater than or equal to 14.91 mol % to less than or equal to 15.56 mol %.

The glass compositions described herein include MgO. MgO may lower the viscosity of a glass, which enhances the formability and manufacturability of the glass. The inclusion of MgO in a glass composition may also improve the strain point and the Young's modulus of the glass composition as well as the ion-exchangeability of the glass. However, if too much MgO is added to the glass composition, the liquidus viscosity may be too low for compatibility with slot forming techniques. The glass compositions described herein have a magnesium containing liquidus phase, forsterite, and as a result reducing the amount of MgO in the composition reduces the liquidus temperature, thereby increasing the liquidus viscosity. The addition of too much MgO may also increase the density and the CTE of the glass composition may increase to undesirable levels.

In embodiments, the glass composition may include MgO in an amount from greater than or equal to 4.05 mol % to less than or equal to 5.25 mol %, such as greater than or equal to 4.10 mol % to less than or equal to 5.20 mol %, greater than or equal to 4.15 mol % to less than or equal to 5.15 mol %, greater than or equal to 4.20 mol % to less than or equal to 5.10 mol %, greater than or equal to 4.25 mol % to less than or equal to 5.05 mol %, greater than or equal to 4.30 mol % to less than or equal to 5.00 mol %, greater than or equal to 4.35 mol % to less than or equal to 4.95 mol %, greater than or equal to 4.40 mol % to less than or equal to 4.90 mol %, greater than or equal to 4.45 mol % to less than or equal to 4.85 mol %, greater than or equal to 4.50 mol % to less than or equal to 4.80 mol %, greater than or equal to 4.55 mol % to less than or equal to 4.75 mol %, greater than or equal to 4.60 mol % to less than or equal to 4.70 mol %, greater than or equal to 4.65 mol % to less than or equal to 4.95 mol %, and any and all ranges formed from any of the foregoing values. In embodiments, the glass composition includes MgO in an amount from greater than or equal to 4.35 mol % to less than or equal to 5.17 mol %.

The glass compositions described herein include CaO. CaO may lower the viscosity of a glass, which may enhance the formability, the strain point and the Young's modulus, and may improve the ion-exchangeability of the glass. However, if too much CaO is added to the glass composition, the density and the CTE of the glass composition may increase to undesirable levels.

In embodiments, the glass composition may include CaO in an amount from greater than or equal to 0.04 mol % to less than or equal to 1.1 mol %, such as greater than or equal to 0.05 mol % to less than or equal to 1.1 mol %, greater than or equal to 0.1 mol % to less than or equal to 1.0 mol %, greater than or equal to 0.2 mol % to less than or equal to 0.9 mol %, greater than or equal to 0.3 mol % to less than or equal to 0.8 mol %, greater than or equal to 0.4 mol % to less than or equal to 0.7 mol %, greater than or equal to 0.5 mol % to less than or equal to 0.6 mol %, and any and all ranges formed from any of the foregoing values. In embodiments, the glass composition includes CaO in an amount from greater than or equal to 0.04 mol % to less than or equal to 1.03 mol %.

The glass compositions include one or more fining agents. In embodiments, the fining agents may include, for example, $SnO_2$. In embodiments, the glass composition includes $SnO_2$ in an amount from greater than or equal to 0.1 mol % to less than or equal to 0.2 mol %, such as greater than or equal to 0.10 mol % to less than or equal to 0.20 mol %, greater than or equal to 0.11 mol % to less than or equal to 0.19 mol %, greater than or equal to 0.12 mol % to less than or equal to 0.18 mol %, greater than or equal to 0.13 mol % to less than or equal to 0.17 mol %, greater than or equal to 0.14 mol % to less than or equal to 0.16 mol %, greater than or equal to 0.11 mol % to less than or equal to 0.15 mol %, and any and all ranges formed from any of the foregoing values. In embodiments, the glass composition includes $SnO_2$ in an amount from greater than or equal to 0.18 mol % to less than or equal to 0.19 mol %.

Glass compositions described herein may be free or substantially free of one or more of: ZnO, SrO, BaO, $B_2O_3$, $P_2O_5$, $Li_2O$, $K_2O$, and $Fe_2O_3$. In embodiments, the glass composition may be free or substantially free of all of: ZnO, SrO, BaO, $B_2O_3$, $P_2O_5$, $Li_2O$, $K_2O$, and $Fe_2O_3$. Some of these oxides may be expensive and/or in limited supply. The alkali earth metal oxides can undesirably increase Young's modulus and can slow an ion-exchange process. $B_2O_3$, $P_2O_5$, and $K_2O$ can decrease the amount of compressive stress imparted during an ion-exchange process. Glass articles described herein are able to achieve advantageous properties without the need for these oxides. Accordingly, these oxides may be excluded from the composition. As used herein, the term "substantially free" means that the component is not added as a component of the batch material even though the component may be present in the final glass in very small amounts as a contaminant. As a result of the raw materials and/or equipment used to produce a glass composition of the present disclosure, certain impurities or components that are not intentionally added, can be present in the final glass composition. Such materials are present in the glass composition in minor amounts, referred to "tramp materials." A composition that is "substantially free" of a component means that the component was not purposefully added to the composition, but the composition may still comprise the component in tramp or trace amounts. A composition that is "substantially free" of an oxide means that the oxide is present at an amount less than or equal to 0.1 mol %, for example 0 mol % to 0.1 mol %. As used herein, a glass composition that is "free" of a component, is defined as meaning that the component (e.g., oxide) is not present in the composition, even in tramp or trace amounts.

Physical properties of the glass compositions disclosed herein, and glass articles made from the glass compositions, are discussed below.

In embodiments, the Young's modulus (E) of a glass composition may be less than or equal to 72 GPa, such as less than or equal to 72.0 GPa, less than or equal to 71.5 GPa, less than or equal to 71.0 GPa, less than or equal to 71 GPa, less than or equal to 70.5 GPa, or less. In embodiments, the glass compositions may have a Young's modulus in a range from greater than or equal to 70 GPa to less than or equal to 72 GPa, such as greater than or equal to 70.0 GPa to less than or equal to 72.0 GPa, greater than or equal to 70.5 GPa to less than or equal to 71.5 GPa, greater than or equal to 70.5 GPa to less than or equal to 71.0 GPa, and any and all ranges formed from any of the foregoing values.

Unless specified otherwise, the Young's modulus values and Poisson's ratio values disclosed in this disclosure refer to a value as measured by a resonant ultrasonic spectroscopy technique of the general type set forth in ASTM E2001-13, titled "Standard Guide for Resonant Ultrasound Spectroscopy for Defect Detection in Both Metallic and Nonmetallic Parts." Also, unless specified otherwise, the Young's modulus and Poisson's ratio of a glass composition or article is measured before the composition or article is subjected to any ion-exchange process, or any other strengthening process. In particular, the Young's modulus and Poisson's ratio of a glass composition or article is measured before the composition or article is exposed to an ion-exchange medium, for example, before being immersed in an ion-exchange bath.

In embodiments, the liquidus viscosity of the glass composition may be greater than or equal to 1200 kP, such as greater than or equal to 1300 kP, greater than or equal to 1400 kP, greater than or equal to 1500 kP, greater than or equal to 1600 kP, greater than or equal to 1700 kP, greater than or equal to 1800 kP, greater than or equal to 1900 kP, greater than or equal to 2000 kP, greater than or equal to 2100 kP, greater than or equal to 2200 kP, greater than or equal to 2300 kP, greater than or equal to 2400 kP, greater than or equal to 2500 kP, greater than or equal to 2600 kP, greater than or equal to 2700 kP, greater than or equal to 2800 kP, greater than or equal to 2900 kP, greater than or equal to 3000 kP, greater than or equal to 3100 kP, greater than or equal to 3200 kP, greater than or equal to 3300 kP, greater than or equal to 3400 kP, greater than or equal to 3500 kP, greater than or equal to 3600 kP, greater than or equal to 3700 kP, greater than or equal to 3800 kP, greater than or equal to 3900 kP, or more. In embodiments, the liquidus viscosity of the glass composition may be in a range from greater than or equal to 1200 kP to less than or equal to 4000 kP, such as greater than or equal to 1300 kP to less than or equal to 3900 kP, greater than or equal to 1400 kP to less than or equal to 3800 kP, greater than or equal to 1500 kP to less than or equal to 3700 kP, greater than or equal to 1600 kP to less than or equal to 3600 kP, greater than or equal to 1700 kP to less than or equal to 3500 kP, greater than or equal to 1800 kP to less than or equal to 3400 kP, greater than or equal to 1900 kP to less than or equal to 3300 kP, greater than or equal to 2000 kP to less than or equal to 3200 kP, greater than or equal to 2100 kP to less than or equal to 3100 kP, greater than or equal to 2000 kP to less than or equal to 3000 kP, greater than or equal to 2100 kP to less than or equal to 2900 kP, greater than or equal to 2200 kP to less than or equal to 2800 kP, greater than or equal to 2300 kP to less than or equal to 2700 kP, greater than or equal to 2400 kP to less than or equal to 2600 kP, greater than or equal to 2500 kP to less than or equal to 4000 kP, and any and all ranges formed from any of the foregoing values.

As used herein, the term "liquidus viscosity" refers to the viscosity of a molten glass at the liquidus temperature, wherein the liquidus temperature refers to the temperature at which crystals first appear as a molten glass cools down from the melting temperature, or the temperature at which the very last crystals melt away as temperature is increased from room temperature. Unless specified otherwise, a liquidus viscosity value disclosed in this application is determined by the following method. First, the liquidus temperature of the glass is measured in accordance with ASTM C829-81 (2015), titled "Standard Practice for Measurement of Liquidus Temperature of Glass by the Gradient Furnace Method." Next, the viscosity of the glass at the liquidus temperature is measured in accordance with ASTM C965-96 (2012), titled "Standard Practice for Measuring Viscosity of Glass Above the Softening Point". Unless specified otherwise, the liquidus viscosity and temperature of a glass composition or article is measured before the composition or article is subjected to any ion-exchange process, or any other strengthening process. In particular, the liquidus viscosity and temperature of a glass composition or article is measured before the composition or article is exposed to an ion-exchange solution, for example, before being immersed in an ion-exchange solution.

In embodiments, the liquidus temperature of the glass composition may be less than or equal to 1000° C., such as be less than or equal to 975° C., be less than or equal to 950° C., be less than or equal to 925° C., be less than or equal to 900° C., be less than or equal to 875° C., be less than or equal to 850° C., be less than or equal to 825° C., or less. In embodiments, the liquidus temperature of the glass composition may be in a range from greater than or equal to 800° C. to less than or equal to 1000° C., such as greater than or equal to 825° C. to less than or equal to 975° C., greater than or equal to 850° C. to less than or equal to 950° C., greater than or equal to 875° C. to less than or equal to 925° C., greater than or equal to 800° C. to less than or equal to 900° C., and any and all ranges formed from any of the foregoing endpoints. Unless otherwise indicated, the liquidus temperature of the glass is measured in accordance with ASTM C829-81 (2015), titled "Standard Practice for Measurement of Liquidus Temperature of Glass by the Gradient Furnace Method." Unless otherwise specified, the liquidus temperature herein refers to the internal liquidus temperature.

From the above compositions, glass articles according to embodiments may be formed by any suitable method, for example slot forming, float forming, rolling processes, etc. The glass composition and the articles produced therefrom may be characterized by the manner in which it may be formed. For instance, the glass composition may be characterized as float-formable (i.e., formed by a float process), down-drawable and, in particular, slot-drawable.

Embodiments of the glass articles described herein may be formed by a down-draw process. Down-draw processes produce glass articles having a uniform thickness that possess relatively pristine surfaces. Because the average flexural strength of the glass article is controlled by the amount and size of surface flaws, a pristine surface that has had minimal contact has a higher initial strength. In addition, down drawn glass articles have a very flat, smooth surface that can be used in its final application without costly grinding and polishing.

Embodiments of the glass articles described herein may be formed by a slot draw process. In the slot draw processes, the molten raw material glass is provided to a drawing tank.

The bottom of the drawing tank has an open slot with a nozzle that extends the length of the slot. The molten glass flows through the slot and/or nozzle and is drawn downward as a continuous glass article and into an annealing region.

Drawing processes for forming glass articles, for example, glass sheets, are desirable because they allow a thin glass article to be formed with few defects. The liquidus viscosities, for example a liquidus viscosity greater than or equal to 1200 kP, of the glass compositions described herein are compatible with a drawing process, and in particular a slot drawing process. The liquidus temperatures of the glass compositions described herein also increase the compatibility of the glass compositions with existing forming methods, such as slot drawing methods. Thus, the glass compositions described herein are compatible with existing forming methods, increasing the manufacturability of glass articles formed from the glass compositions.

In one or more embodiments, the glass articles described herein may exhibit an amorphous microstructure and may be substantially free of crystals or crystallites. In other words, the glass articles exclude glass-ceramic materials in some embodiments. In some embodiments, the glass articles described herein may include glass-ceramic materials.

As mentioned above, the glass compositions, and articles made from the glass compositions, can be strengthened by an ion-exchange process. With reference to FIG. 1, a glass article 100 may have one or more regions under compressive stress. For example, glass article 100 may have a first compressive stress region 120 and/or a second compressive stress region 122, extending from exterior surfaces of glass article 100 (e.g., surfaces 110, 112) to a depth of compression (DOC, d1, d2) and a second region (e.g., central region 130) under a tensile stress or CT extending from the DOC into the central or interior region of glass article 100. Ion-exchanged compressive stress regions 120, 122 have a concentration of a metal oxide that is different at two or more points through a thickness (t) of glass article 100. The compressive stress of both regions 120 and 122 is balanced by stored tension in the central region 130 of glass article 100.

According to the convention normally used in the art, compression or compressive stress (CS) is expressed as a negative (<0) stress and tension or tensile stress is expressed as a positive (>0) stress. Throughout this description, however, CS is expressed as a positive or absolute value—i.e., as recited herein, CS=|CS|. The CS may have a maximum at the surface of the glass, and the CS may vary with a distance d from the surface according to a function. Referring again to FIG. 1, a first compressive stress region 120 extends from first surface 110 to a depth $d_1$ and a second compressive stress region 122 extends from second surface 112 to a depth $d_2$. Together, these compressive stress regions 120, 122 define the compression region or CS region of glass article 100.

In embodiments, the peak compressive stress of one or more compressive stress regions of the glass article may be in a range from greater than or equal to 850 MPa to less than or equal to 1400 MPa, such as greater than or equal to 900 MPa to less than or equal to 1350 MPa, greater than or equal to 950 MPa to less than or equal to 1300 MPa, greater than or equal to 1000 MPa to less than or equal to 1250 MPa, greater than or equal to 1050 MPa to less than or equal to 1200 MPa, greater than or equal to 1100 MPa to less than or equal to 1150 MPa, and any and all ranges formed between the foregoing values. In embodiments, the peak compressive stress of one or more compressive stress regions of the glass article may be greater than or equal to 900 MPa, such as greater than or equal to 950 MPa, greater than or equal to 1000 MPa, greater than or equal to 1050 MPa, greater than or equal to 1100 MPa, greater than or equal to 1150 MPa, greater than or equal to 1200 MPa, greater than or equal to 1250 MPa, greater than or equal to 1300 MPa, greater than or equal to 1350 MPa, or more.

In embodiments, glass articles made from the glass compositions described herein may have a ratio of peak compressive stress value to Young's modulus value (peak compressive stress value/Young's modulus value, CS/E, where Young's modulus is in GPa and CS is in MPa) of 13.0, such as greater than or equal to 13.1, greater than or equal to 13.2, greater than or equal to 13.3, greater than or equal to 13.4, greater than or equal to 13.5, greater than or equal to 13.6, greater than or equal to 13.7, greater than or equal to 13.8, greater than or equal to 13.9, greater than or equal to 14.0, greater than or equal to 14.1, or more. In embodiments, the glass articles may have a CS/E ratio of the type described herein in the range from greater than or equal to 13.0 to less than or equal to 18.0, such as greater than or equal to 13.1 to less than or equal to 17.5, greater than or equal to 13.2 to less than or equal to 17.0, greater than or equal to 13.3 to less than or equal to 16.5, greater than or equal to 13.4 to less than or equal to 16.0, greater than or equal to 13.5 to less than or equal to 15.5, greater than or equal to 13.6 to less than or equal to 15.0, greater than or equal to 13.7 to less than or equal to 14.5, greater than or equal to 13.8 to less than or equal to 14.1, greater than or equal to 13.9 to less than or equal to 14.0, and any and all ranges formed from any of the foregoing values. For the calculation of the CS/E ratios described herein, the Young's modulus (E) is the Young's modulus of the glass substrate utilized to form the glass article or, alternatively, the Young's modulus of a glass having the same composition as the center of the glass article.

These CS/E ratios, and CS/E ratio ranges, may be achieved at the peak compressive stress and/or at the depths of compression described herein. For example, in embodiments, a glass article may have a CS/E ratio, or CS/E ratio range, as described above with a peak compressive stress in a range of greater than or equal to 850 MPa to less than or equal to 1400 MPa. In embodiments, a glass article may have a CS/E ratio, or CS/E ratio range, as described above with a depth of compression in a range of 5 microns to 40 microns. In embodiments, a glass article may have a CS/E ratio, or CS/E ratio range, as described above with a depth of compression in a range from greater than or equal to 5 µm to less than or equal to 40 µm. In embodiments, a glass article may have a CS/E ratio, or CS/E ratio range, as described above with a depth of compression in a range from greater than or equal to 5% to less than or equal to 20% of a thickness of the glass article. In embodiments, a glass article may have a CS/E ratio, or CS/E ratio range, as described above with a peak compressive stress in a range from greater than or equal to 850 MPa to less than or equal to 1400 MPa and a depth of compression in a range from greater than or equal to 5 µm to less than or equal to 40 µm.

The high peak compressive stresses that may be achieved by ion-exchange provide the capability to bend the glass to a tighter (i.e., smaller) bend radius for a given glass thickness. The high peak compressive stress allows the glass to retain net compression and thus contain surface flaws when the glass is subjected to bending around a tight radius. Near-surface flaws cannot extend to failure if they are contained under this net compression, or are disposed within the effective surface compressive layer.

Figure 2:
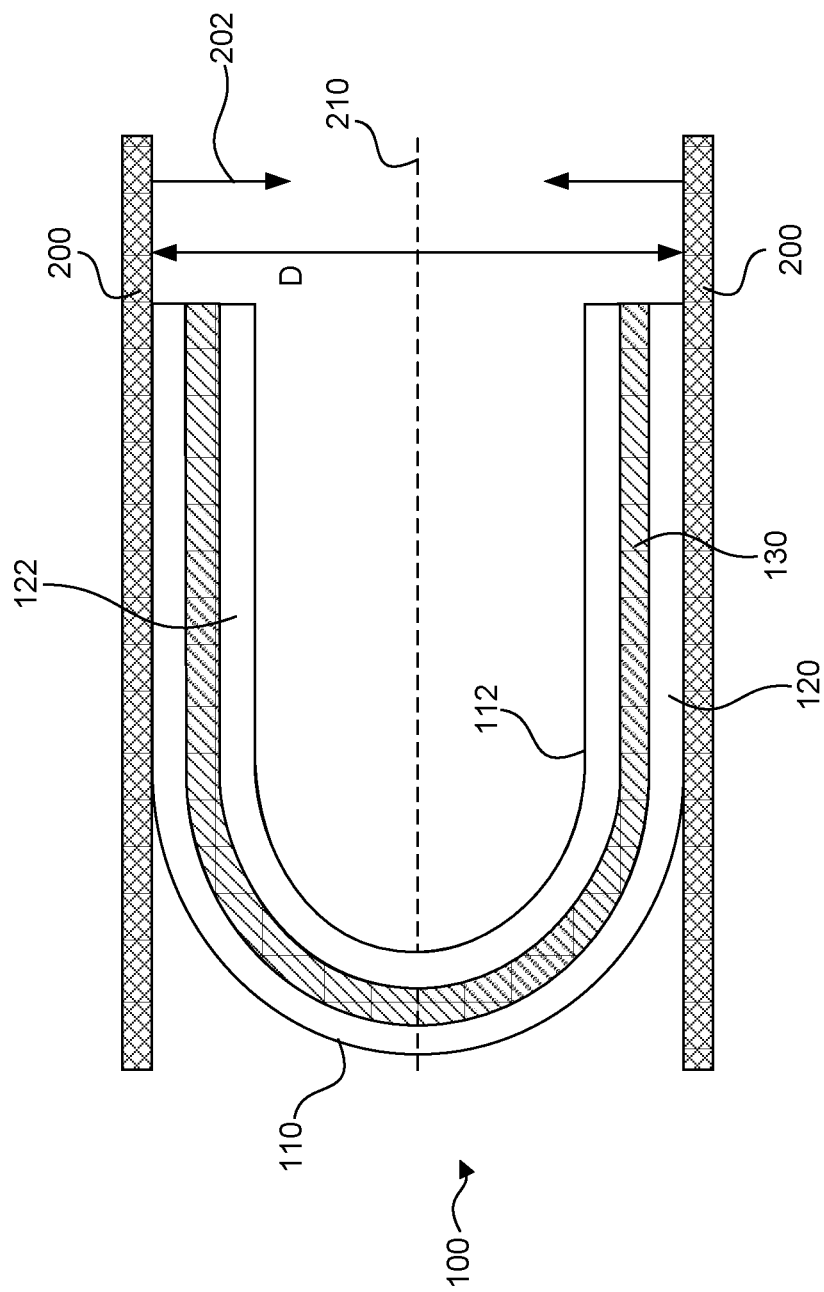
FIG. 2 illustrates a cross-sectional view of a glass article according to some embodiments upon bending of the glass article.

FIG. 2 illustrates two-point bending of a glass article 100 between two plates 200 using a bend force 202. A bend force 202 is applied using a two-point bend test apparatus where two plates 200 are pressed against glass article 100 during a bending test with a constant force, bend force 202. If needed, fixtures associated with the test apparatus ensure that glass article 100 is bent symmetrically relative to a fold line 210 as the bend force 202 is applied to glass article 100 via plates 200. Plates 200 can be moved together in unison until a particular plate distance D is achieved. As used herein, the term "failure" under a bending force refers to breakage, destruction, delamination, crack propagation, permanent deformation, or other mechanism that renders an article unsuitable for its intended purpose.

In FIG. 2, surface 110 of glass article 100 is subjected to a tensile stress from the bending, which causes an effective DOC from the surface to decrease from the DOC from surface 110 when the article is unbent, while surface 112 is subjected to additional compressive stress from the bending. The effective DOC from surface 110 increases with increasing plate distance and decreases with decreasing plate distance (when surface 112 of article 100 is bent towards itself as shown in FIG. 2). In other words, the effective DOC is the DOC in an unbent condition minus an effective depth from the tensile stress induced by the bend.

In embodiments, glass article 100 avoids failure during a static two-point bend test when held between two plates 200 at a plate distance (D) of 10 mm or less for 240 hours at 60° C. and 93% relative humidity. For example, in embodiments, glass article 100 avoids failure during a static two-point bend test when held between two plates for 240 hours at 60° C. and 93% relative humidity to a plate distance (D) of 10 mm to 1 mm. The plate distance (D) may be, for example, 10 mm, 9 mm, 8 mm, 7 mm, 6 mm, 5 mm, 4 mm, 3 mm, 2 mm, 1 mm, or any distance falling within a range formed from any of these values.

DOC may be measured by a surface stress meter or a scattered light polariscope (SCALP) depending on the ion exchange treatment and the thickness of the article being measured. Where the stress in the substrate is generated by exchanging potassium ions into the substrate, a surface stress meter, for example, the FSM-6000 (Orihara Industrial Co., Ltd., Japan), is used to measure depth of compression. Where the stress is generated by exchanging sodium ions into the substrate, and the article being measured is thicker than about 400 microns, SCALP is used to measure the depth of compression and maximum central tension (CT). Where the stress in the substrate is generated by exchanging both potassium and sodium ions into the glass, and the article being measured is thicker than about 400 microns, the depth of compression and CT are measured by SCALP. Without wishing to be bound by theory, the exchange depth of sodium may indicate the depth of compression while the exchange depth of potassium ions may indicate a change in the magnitude of the compressive stress (but not necessarily the change in stress from compressive to tensile). As used herein, "depth of layer" means the depth that the ions have exchanged into the substrate (e.g., sodium, potassium). Through the disclosure, when the maximum central tension cannot be measured directly by SCALP (as when the article being measured is thinner than about 400 microns) the maximum central tension can be approximated by product of a maximum compressive stress and a depth of compression divided by the difference between the thickness of the substrate and twice the depth of compression, wherein the compressive stress and depth of compression are measured by FSM.

When the substrate thickness is greater than about 400 microns, the refracted near-field (RNF) method may also be used to derive a graphical representation of the stress profile. When the RNF method is utilized to derive a graphical representation of the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, entitled "Systems and methods for measuring a profile characteristic of a glass sample", which is incorporated herein by reference in its entirety. In particular, the RNF method includes placing the glass article adjacent to a reference block, generating a polarization-switched light beam that is switched between orthogonal polarizations at a rate of from 1 Hz to 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal.

When a SCALP measurement is performed, it is done using SCALP polariscope (e.g., SCALP-04 or SCALP-05), available from GlassStress Ltd., Talinn, Estonia. The precise sample speed SS and exposure times $t_E$ to reduce the measurement noise in the polarimeter to an acceptable level when measuring a sample to characterize at least one stress-related characteristic depends on a number of factors. These factors include the characteristics of the image sensing device (e.g., the gain, image capture rate (frames/second), pixel size, internal pixel average techniques, etc.), as well as the nature of the no-stress-related (NSR) scattering feature(s), the intensity of the input light beam, the number of polarization states used, etc. Other factors include the measurement wavelength of the light beam from the laser source and the intensity of the scattered light beam. Example measurement wavelengths can include 640 nanometers (nm), 518 nm and 405 nm. Example exposure times can range from 0.05 millisecond to 100 milliseconds. Example frame rates can range from 10 to 200 frames per second. Example calculations of the optical retardation can utilize from two to two-hundred frames over a measurement time $t_M$ of from 0.1 seconds to 10 seconds.

In embodiments, the glass article may have a maximum CT in the range from greater than or equal to 20 MPa to less than or equal to 400 MPa, such as greater than or equal to 50 MPa to less than or equal to 350 MPa, greater than or equal to 75 MPa to less than or equal to 300 MPa, greater than or equal to 100 MPa to less than or equal to 250 MPa, greater than or equal to 150 MPa to less than or equal to 200 MPa, and any and all ranges formed from any of the foregoing values.

In embodiments, the DOC of region 120 and region 122 may be equivalent, such that the stress profile of the glass article is symmetrical. In other embodiments, the DOC of region 120 and region 122 may be different. In embodiments, the DOC of the glass article may be in a range from greater than or equal to 5 μm to less than or equal to 40 μm, such as greater than or equal to 10 µm to less than or equal to 35 µm, greater than or equal to 15 µm to less than or equal to 30 µm, greater than or equal to 20 µm to less than or equal to 25 µm, greater than or equal to 20 µm to less than or equal to 40 µm, and any and all ranges formed from any of the foregoing values. In embodiments, the DOC of the glass article may be greater than or equal to 5 µm, such as greater than or equal to 10 µm, greater than or equal to 15 µm, greater than or equal to 20 µm, greater than or equal to 25 µm, greater than or equal to 30 µm, greater than or equal to 35 µm, or more.

The DOC may also be reported as a portion of the thickness (t) of the glass article 100. In embodiments, the glass articles may have a depth of compression (DOC) in a range from greater than or equal to 5% (0.05t) of the thickness of the glass article to less than or equal to 20% (0.20t) of the thickness of the glass article, such as from greater than or equal to 10% (0.10t) of the thickness of the glass article to less than or equal to 15% (0.15t) of the thickness of the glass article, and any and all ranges formed from any of the foregoing values.

Thickness (t) of glass article 100 is measured between surface 110 and surface 112. In embodiments, the thickness of glass article 100 may be less than or equal to 4 mm, such as less than or equal to 3.5 mm, less than or equal to 3 mm, less than or equal to 2.5 mm, less than or equal to 2 mm, less than or equal to 1.5 mm, less than or equal to 1 mm, less than or equal to 1000 µm, less than or equal to 975 µm, less than or equal to 950 µm, less than or equal to 925 µm, less than or equal to 900 µm, less than or equal to 875 µm, less than or equal to 850 µm, less than or equal to 825 µm, less than or equal to 800 µm, less than or equal to 775 µm, less than or equal to 750 µm, less than or equal to 725 µm, less than or equal to 700 µm, less than or equal to 675 µm, less than or equal to 650 µm, less than or equal to 625 µm, less than or equal to 600 µm, less than or equal to 575 µm, less than or equal to 550 µm, less than or equal to 525 µm, less than or equal to 500 µm, less than or equal to 475 µm, less than or equal to 450 µm, less than or equal to 425 µm, less than or equal to 400 µm, less than or equal to 375 µm, less than or equal to 350 µm, less than or equal to 325 µm, less than or equal to 300 µm, less than or equal to 275 µm, less than or equal to 250 µm, less than or equal to 225 µm, less than or equal to 200 µm, less than or equal to 175 µm, less than or equal to 150 µm, less than or equal to 125 µm, less than or equal to 100 µm, less than or equal to 75 µm, less than or equal to 50 µm, less than or equal to 25 µm, or less. In embodiments, the thickness of glass article 100 may be in a range from greater than or equal to 15 µm to less than or equal to 4 mm, such as greater than or equal to 25 µm to less than or equal to 3.5 mm, greater than or equal to 50 µm to less than or equal to 3 mm, greater than or equal to 75 µm to less than or equal to 2.5 mm, greater than or equal to 100 µm to less than or equal to 2 mm, greater than or equal to 125 µm to less than or equal to 2.5 mm, greater than or equal to 150 µm to less than or equal to 2 mm, greater than or equal to 175 µm to less than or equal to 1.5 mm, greater than or equal to 200 µm to less than or equal to 1 mm, greater than or equal to 225 µm to less than or equal to 1000 µm, greater than or equal to 250 µm to less than or equal to 975 µm, greater than or equal to 275 µm to less than or equal to 950 µm, greater than or equal to 300 µm to less than or equal to 925 µm, greater than or equal to 325 µm to less than or equal to 900 µm, greater than or equal to 350 µm to less than or equal to 875 µm, greater than or equal to 375 µm to less than or equal to 850 µm, greater than or equal to 400 µm to less than or equal to 825 µm, greater than or equal to 425 µm to less than or equal to 800 µm, greater than or equal to 450 µm to less than or equal to 775 µm, greater than or equal to 475 µm to less than or equal to 750 µm, greater than or equal to 500 µm to less than or equal to 725 µm, greater than or equal to 525 µm to less than or equal to 700 µm, greater than or equal to 550 µm to less than or equal to 675 µm, greater than or equal to 575 µm to less than or equal to 650 µm, greater than or equal to 600 µm to less than or equal to 625 µm, greater than or equal to 15 µm to less than or equal to 200 µm, and any and all ranges formed from any of the foregoing endpoints. In embodiments, the glass substrate utilized to form the glass article may have the same thickness as the thickness desired for the glass article.

Compressive stress layers that extend from a surface of the glass article to a depth of compression may be formed in the glass article by exposing a glass substrate to an ion-exchange medium. In embodiments, the ion-exchange medium may be a molten salt bath, such as a molten salt bath that includes a molten potassium salt. In embodiments, the ion-exchange medium may include a potassium salt in an amount greater than or equal to 50 wt %, such as greater than or equal to 60 wt %, greater than or equal to 70 wt %, greater than or equal to 80 wt %, greater than or equal to 90 wt %, or 100 wt %. In embodiments, the ion-exchange medium includes a potassium salt in a range from greater than or equal to 50 wt % to less than or equal to 100 wt %, such as greater than or equal to 60 wt % to less than or equal to 95 wt %, greater than or equal to 70 wt % to less than or equal to 90 wt %, greater than or equal to 80 wt % to less than or equal to 100 wt %, and any and all ranges formed from any of the foregoing values. In embodiments, the potassium salt may be $KNO_3$. In embodiments, all or a portion of the remaining weight percent in the ion-exchange medium may be a molten nitrate salt, such as $NaNO_3$.

The glass substrate may be exposed to the ion-exchange medium by immersing the glass substrate into a bath of the ion-exchange medium, spraying the ion-exchange medium onto the glass substrate, or otherwise physically applying the ion-exchange medium to the glass substrate. The glass substrates may be formed from any of the glass compositions described herein. After an ion-exchange process is performed, it should be understood that a composition at the surface of a glass article may be different than the composition of the as-formed glass substrate (for example, the glass substrate before it undergoes an ion-exchange process). This results from one type of alkali metal ion in the as-formed glass, for example $Na^+$, being replaced with larger alkali metal ions, for example $K^+$. However, the glass composition at the center of the glass article will, in some embodiments, still have the same or substantially the same composition as the as-formed glass substrate. Unless specified otherwise, glass compositions disclosed in this application are compositions of the glass article at the center of the glass article where the composition is unaffected (or is least affected) by the ion-exchange process, i.e., the composition of the as-formed glass substrate. For this reason, a glass having the same composition as the composition at the center of the glass article is expected to have the same properties as the glass substrate. As utilized herein, the center of the glass article refers to any location within the glass article that is a distance of at least 0.5t, where t is the thickness of the glass article, from all surfaces thereof.

Upon exposure to the glass substrate, the ion-exchange medium may, according to embodiments, be at a temperature from greater than or equal to 350° C. to less than or equal to 480° C., such as greater than or equal to 360° C. to less than or equal to 470° C., greater than or equal to 370° C. to less than or equal to 460° C., greater than or equal to 380° C. to less than or equal to 450° C., greater than or equal to 390° C. to less than or equal to 440° C., greater than or equal to 400° C. to less than or equal to 430° C., greater than or equal to 410° C. to less than or equal to 420° C., and all ranges formed between the foregoing values.

In embodiments, the glass substrate may be exposed to the ion-exchange medium for a duration from greater than or equal to 1 hour to less than or equal to 24 hours, such as greater than or equal to 2 hours to less than or equal to 20 hours, greater than or equal to 4 hours to less than or equal to 16 hours, greater than or equal to 6 hours to less than or equal to 12 hours, greater than or equal to 8 hours to less than or equal to 12 hours, greater than or equal to 1 hour to less than or equal to 8 hours, and all ranges formed from any of the foregoing values.

The glass articles may also be subjected to additional processing. In embodiments, the glass articles may be etched after being ion exchanged. The etching may be employed to reduce the thickness of the glass article and/or to achieve a desired shape. In embodiments, the glass articles may have the same or substantially the same thickness as the glass substrate utilized to form the glass article.

Figure 3B:
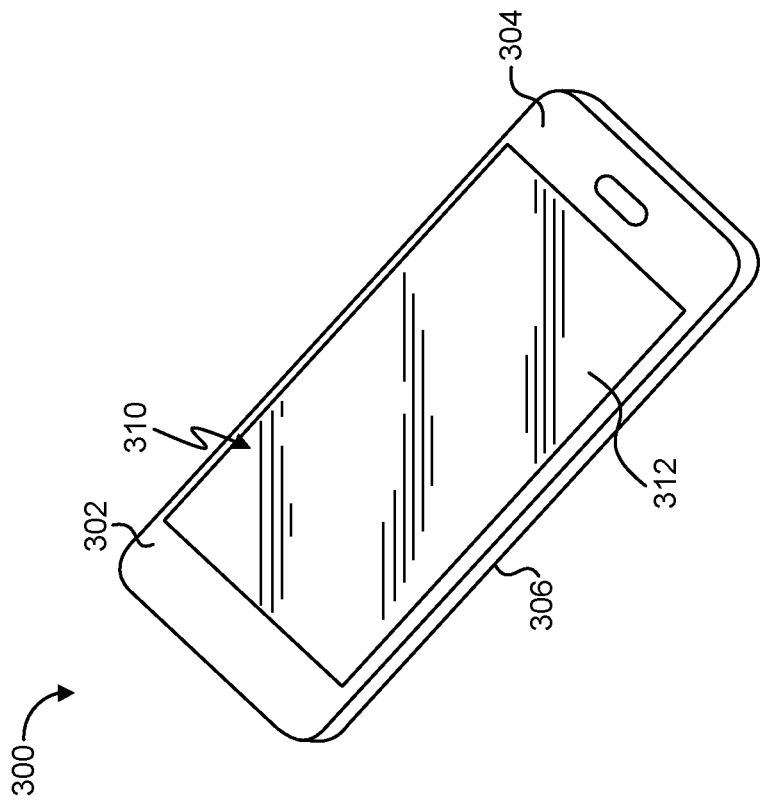
FIG. 3B is a perspective view of the exemplary electronic device of FIG. 3A.
Figure 3A:
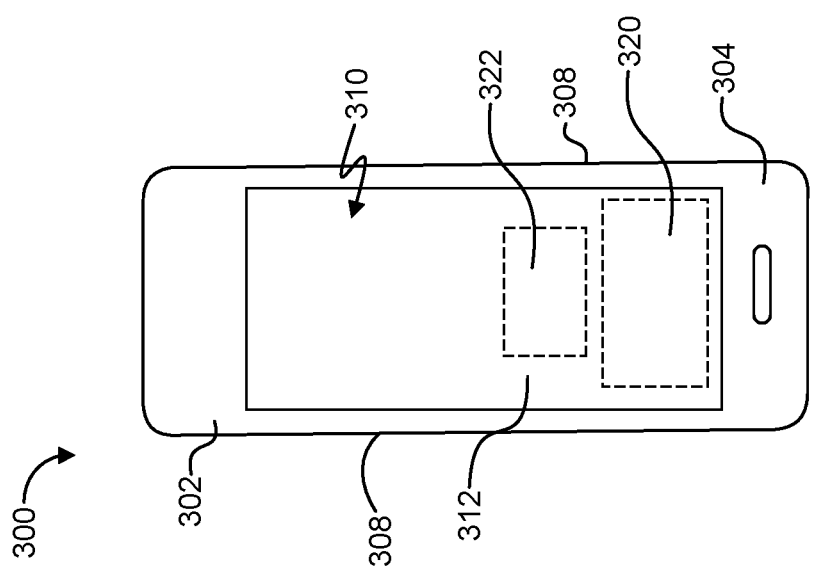
FIG. 3A is a plan view of an exemplary electronic device incorporating a glass article according to any of the glass articles disclosed herein.

The glass articles disclosed herein may be incorporated into another article for example an article with a display (or display articles) (e.g., consumer electronics, including mobile phones, watches, tablets, computers, navigation systems, and the like), architectural articles, transportation articles (e.g., automobiles, trains, aircraft, sea craft, etc.), appliance articles, or any article that may benefit from some transparency, scratch-resistance, abrasion resistance or a combination thereof. An exemplary article incorporating any of the glass articles disclosed herein is shown in FIGS. 3A and 3B. Specifically, FIGS. 3A and 3B show a consumer electronic product 300 including a housing 302 having a front surface 304, a back surface 306, and side surfaces 308. Electrical components that are at least partially inside or entirely within the housing may include at least a controller 320, a memory 322, and a display 310 at or adjacent to front surface 306 of housing 302. Display 310 may be, for example, a light emitting diode (LED) display or an organic light emitting diode (OLED) display.

A cover substrate 312 may be disposed at or over front surface 304 of housing 302 such that it is disposed over display 310. Cover substrate 312 may include any of the glass articles disclosed herein and may be referred to as a "cover glass." Cover substrate 312 may serve to protect display 310 and other components of consumer electronic product 300 (e.g., controller 320 and memory 322) from damage. In some embodiments, cover substrate 312 may be bonded to display 310 with an adhesive. In some embodiments, cover substrate 312 may define all or a portion of front surface 304 of housing 302. In some embodiments, cover substrate 312 may define front surface 304 of housing 302 and all or a portion of side surfaces 308 of housing 302. In some embodiments, consumer electronic product 300 may include a cover substrate defining all or a portion of back surface 306 of housing 302.

EXAMPLES

Embodiments will be further clarified by the following examples. It should be understood that these examples are not limiting to the embodiments described above.

Glass compositions were prepared by conventional glass forming methods and the analyzed compositions are listed in Table 1 below. Compositions 1-13 in Table 1 are glass compositions according to embodiments of the present application. Composition A in Table 1 is a comparative composition made with similar oxides. In Table 1, all components are in mol %, and any components not reported were not detected. Generally, amounts of 0.01 mol % or less in Table 1 are considered to be tramp amounts and these components were not purposefully added to the compositions.

Table 2 lists material properties of the compositions in Table 1. The Young's modulus (E) values reported in Table 2 were measured according to the methods disclosed in this specification. The shear modulus values were measured by a resonant ultrasonic spectroscopy technique of the general type set forth in ASTM E2001-13, titled "Standard Guide for Resonant Ultrasound Spectroscopy for Defect Detection in Both Metallic and Non-metallic Parts."

Additional material properties listed in Table 2 include: density, where the density values were determined using the buoyancy method of ASTM C693-93(2013); CTE (in a range of 0° C. to 300° C.) measured in part per million (ppm) per degree Celsius (ppm/° C.) using a fiber elongation technique; strain, anneal and softening points, where the strain and annealing points were determined using the fiber elongation method of ASTM C336-71(2015), and softening points were determined using the fiber elongation method of ASTM C338-93(2013); liquidus temperatures as determined as discussed herein, liquidus viscosities determined as discussed herein; and stress optical coefficient (SOC), which is related to the birefringence of the glass. Unless specified otherwise, SOC is measured according to Procedure C (Glass Disc Method) described in ASTM standard C770-16, entitled "Standard Test Method for Measurement of Glass Stress-Optical Coefficient," the contents of which are incorporated herein by reference in their entirety. Unless specified otherwise, the properties listed in Table 2 were measured before the composition or article was subjected to any ion-exchange process, or any other strengthening process. A dilatometer was set up according to ASTM E228 ("Standard Test Method for Linear Thermal Expansion of Solid Materials With a Push-Rod Dilatometer"). For the fiber elongation test, a fiber sample of a particular composition mounted in the dilatometer was inserted into a 0° C. ice bath and then a 300° C. isothermal furnace to determine the average linear coefficient of thermal expansion over that temperature range. The fiber samples were prepared by flameworking. In Table 2, the liquidus temperature was not achieved for Composition 5, and thus is reported as less than 950° C. and the liquidus viscosity is reported as greater than 3823 kP. In all of the compositions in Table 2 for which the liquidus temperature was achieved the liquidus phase was forsterite.

Table 3 includes ion-exchange durations and properties for Compositions 1-13 and Composition A of Table 1. For the ion-exchange processes reported in Table 3, samples of each composition were immersed in a molten salt bath composed of 100 wt % $KNO_3$ at a temperature of 410° C. Each sample had a thickness of 0.8 mm. The compressive stress and depth of layer were measured by FSM.

TABLE 1

| Composition | A | 1 | 2 | 3 | 4 | 5 | 6 |
|---|---|---|---|---|---|---|---|
| $SiO_2$ | 68.95 | 69.03 | 69.10 | 69.17 | 69.23 | 69.04 | 68.98 |
| $Al_2O_3$ | 10.27 | 10.32 | 10.32 | 10.05 | 10.01 | 10.30 | 10.07 |
| MgO | 5.36 | 4.88 | 4.86 | 5.08 | 5.17 | 4.88 | 5.14 |
| CaO | 0.05 | 0.52 | 0.27 | 0.27 | 0.10 | 0.04 | 0.04 |
| $Na_2O$ | 15.20 | 15.06 | 15.25 | 15.23 | 15.29 | 15.53 | 15.56 |
| $K_2O$ | tramp | 0.01 | 0.00 | 0.00 | 0.00 | 0.01 | 0.00 |
| $SnO_2$ | 0.17 | 0.18 | 0.19 | 0.18 | 0.19 | 0.18 | 0.18 |
| $TiO_2$ | | | | | | | |
| $Fe_2O_3$ | tramp | 0.01 | 0.01 | 0.01 | 0.01 | 0.01 | 0.01 |
| $Al_2O_3$ + MgO + CaO | 15.68 | 15.72 | 15.45 | 15.40 | 15.28 | 15.22 | 15.25 |

TABLE 1-continued

| Composition | 7 | 8 | 9 | 10 | 11 | 12 | 13 |
|---|---|---|---|---|---|---|---|
| $SiO_2$ | 69.13 | 69.05 | 69.12 | 69.09 | 69.05 | 69.07 | 68.80 |
| $Al_2O_3$ | 10.32 | 10.31 | 10.10 | 10.31 | 10.31 | 10.11 | 10.10 |
| MgO | 4.66 | 4.62 | 4.78 | 4.35 | 4.37 | 4.35 | 4.85 |
| CaO | 0.77 | 0.58 | 0.52 | 1.03 | 0.78 | 0.77 | 0.51 |
| Na2O | 14.91 | 15.23 | 15.27 | 15.02 | 15.29 | 15.49 | 15.53 |
| $K_2O$ | 0.01 | 0.00 | 0.01 | 0.01 | 0.01 | 0.01 | 0.01 |
| $SnO_2$ | 0.19 | 0.19 | 0.18 | 0.18 | 0.18 | 0.18 | 0.18 |
| $TiO_2$ | | | | | | | 0.01 |
| $Fe_2O_3$ | 0.01 | 0.01 | 0.01 | 0.01 | 0.01 | 0.01 | |
| $Al_2O_3$ + MgO + CaO | 15.75 | 15.51 | 15.40 | 15.69 | 15.46 | 15.23 | 15.46 |

TABLE 2

| Composition | | A | 1 | 2 | 3 | 4 | 5 | 6 |
|---|---|---|---|---|---|---|---|---|
| Density ($g/cm^3$) | | 2.432 | 2.438 | 2.436 | 2.436 | 2.439 | 2.435 | 2.435 |
| CTE (ppm/° C.) | | 8.14 | 8.09 | 8.17 | 8.17 | 8.14 | 8.23 | 8.28 |
| Stain Point (° C.) | | 599 | 595 | 595 | 592 | 587 | 594 | 591 |
| Annealing Point (° C.) | | 652 | 647 | 648 | 644 | 639 | 647 | 643 |
| Softening Point (° C.) | | 895.4 | 892.2 | 890 | 886.6 | 880.7 | 888.9 | 884.2 |
| Young's modulus (GPa) | | 71.5 | 71.4 | 71.1 | 71.1 | 71.2 | 70.7 | 70.8 |
| Shear modulus (GPa) | | 29.6 | 29.6 | 29.4 | 29.4 | 29.5 | 29.4 | 29.4 |
| Poisson's ratio | | 0.205 | 0.205 | 0.206 | 0.206 | 0.208 | 0.205 | 0.207 |
| RI | | 1.4994 | 1.5015 | 1.5005 | 1.5013 | 1.5019 | 1.5008 | 1.5007 |
| SOC | | 2.970 | 3.001 | 3.024 | 3.010 | 3.004 | 3.015 | 3.016 |
| Liquidus Temperature | Duration (hours) | 24 | 24 | 24 | 24 | 24 | 24 | 24 |
| | Air (° C.) | 1020 | 995 | 985 | 990 | 975 | <950 | 970 |
| | Internal (° C.) | 1040 | 995 | 980 | 985 | 970 | <950 | 970 |
| | Pt (° C.) | 1010 | 985 | 980 | 980 | 965 | <950 | 960 |
| | Primary Phase | Forsterite | Forsterite | Forsterite | Forsterite | Forsterite | — | Forsterite |
| Liquidus Viscosity (kP) | | 598 | 1465 | 2139 | 1215 | 1677 | >3823 | 2087 |

| Composition | | 7 | 8 | 9 | 10 | 11 | 12 | 13 |
|---|---|---|---|---|---|---|---|---|
| Density ($g/cm^3$) | | 2.439 | 2.439 | 2.439 | 2.441 | 2.44 | 2.442 | 2.441 |
| CTE (ppm/° C.) | | 8.02 | 8.16 | 8.24 | 8.07 | 8.16 | 8.26 | |
| Stain Point (° C.) | | 595 | 591 | 589 | 589 | 587 | 582 | 585 |
| Annealing Point (° C.) | | 647 | 643 | 641 | 641 | 639 | 633 | 633 |
| Softening Point (° C.) | | 889.7 | 887.3 | 882.5 | 882.4 | 883.6 | 873.6 | 870.1 |
| Young's modulus (GPa) | | 71.6 | 71.2 | 71.2 | 71.7 | 71.4 | 71.2 | 70.8 |
| Shear modulus (GPa) | | 29.7 | 29.6 | 29.6 | 29.7 | 29.6 | 29.6 | 29.4 |
| Poisson's ratio | | 0.203 | 0.2 | 0.202 | 0.206 | 0.206 | 0.205 | 0.203 |
| RI | | 1.5021 | 1.5017 | 1.5017 | 1.5025 | 1.5020 | 1.5021 | 1.5159 |
| SOC | | 3.020 | 3.009 | 3.014 | 2.998 | 3.012 | 2.977 | 2.989 |
| Liquidus Temperature | Duration (hours) | 24 | 24 | 24 | 24 | 24 | 24 | 24 |
| | Air (° C.) | 990 | 1000 | 975 | 970 | 985 | 980 | 980 |
| | Internal (° C.) | 995 | 995 | 975 | 965 | 970 | 980 | 980 |
| | Pt (° C.) | 985 | 1000 | 970 | 970 | 965 | 980 | 975 |
| | Primary Phase | Forsterite | Forsterite | Forsterite | Forsterite | Forsterite | Forsterite | Forsterite |
| Liquidus Viscosity (kP) | | 1480 | 1399 | 1849 | 2597 | 2281 | 1354 | 1328 |

TABLE 3

| Composition | A | 1 | 2 | 3 | 4 | 5 | 6 | 7 | 8 | 9 | 10 | 11 | 12 | 13 |
|---|---|---|---|---|---|---|---|---|---|---|---|---|---|---|
| Time (hours) | 0.5 | 0.5 | 0.5 | 0.5 | 0.5 | 0.5 | 0.5 | 0.5 | 0.5 | 0.5 | 0.5 | 0.5 | 0.5 | 0.5 |
| CS (MPa) | 999 | 1002 | 980 | 977 | 974 | 974 | 969 | 958 | 969 | 955 | 987 | 960 | 955 | 998 |
| DOL (μm) | 11.8 | 11.6 | 12.2 | 11.9 | 11.7 | 13.2 | 13.0 | 11.7 | 12.0 | 12.1 | 11.3 | 11.8 | 11.9 | 11.7 |
| CS/E (MPa/GPa) | 14.0 | 14.0 | 13.8 | 13.7 | 13.7 | 13.8 | 13.7 | 13.4 | 13.6 | 13.4 | 13.8 | 13.4 | 13.4 | 14.1 |
| Time (hours) | 1 | 1 | 1 | 1 | 1 | 1 | 1 | 1 | 1 | 1 | 1 | 1 | 1 | 1 |
| CS (MPa) | 986 | 989 | 981 | 966 | 964 | 959 | 974 | 960 | 962 | 956 | 979 | 953 | 937 | 978 |
| DOL (μm) | 15.9 | 16.0 | 17.3 | 16.3 | 16.0 | 18.0 | 17.1 | 16.3 | 17.5 | 17.4 | 15.8 | 16.5 | 17.1 | 16.0 |
| CS/E (MPa/GPa) | 13.8 | 13.9 | 13.8 | 13.6 | 13.5 | 13.6 | 13.8 | 13.4 | 13.5 | 13.4 | 13.7 | 13.3 | 13.2 | 13.8 |
| Time (hours) | 2 | 2 | 2 | 2 | 2 | 2 | 2 | 2 | 2 | 2 | 2 | 2 | 2 | 2 |
| CS (MPa) | 974 | 969 | 954 | 949 | 942 | 936 | 931 | 945 | 940 | 929 | 968 | 927 | 925 | 961 |
| DOL (μm) | 23.4 | 22.9 | 24.2 | 24.0 | 22.8 | 25.7 | 24.7 | 22.7 | 24.1 | 24.1 | 21.6 | 23.0 | 23.1 | 22.7 |
| CS/E (MPa/GPa) | 13.6 | 13.6 | 13.4 | 13.3 | 13.2 | 13.2 | 13.1 | 13.2 | 13.2 | 13.0 | 13.5 | 13.0 | 13.0 | 13.6 |
| Time (hours) | 4 | 4 | 4 | 4 | 4 | 4 | 4 | 4 | 4 | 4 | 4 | 4 | 4 | 4 |
| CS (MPa) | 968 | 939 | 915 | 920 | 910 | 902 | 890 | 919 | 908 | 897 | 942 | 903 | 891 | 917 |
| DOL (μm) | 32.8 | 32.6 | 34.2 | 32.9 | 32.5 | 35.3 | 35.2 | 31.3 | 33.2 | 33.3 | 30.5 | 33.0 | 32.0 | 32.4 |
| CS/E (MPa/GPa) | 13.5 | 13.2 | 12.9 | 12.9 | 12.8 | 12.8 | 12.6 | 12.8 | 12.8 | 12.6 | 13.1 | 12.6 | 12.5 | 13.0 |

As demonstrated by the results reported in the above Tables, the compositions of the present application are capable of achieving performance similar to that of existing compositions employed in bendable applications when chemically strengthened while exhibiting increased liquidus viscosities and lower liquidus temperatures that are compatible with drawing techniques, such as slot drawing techniques. Additionally, the results in Table 3 demonstrate that the glass compositions described herein are capable of achieving a CS/E ratio of 13.0 or more in combination with a DOL of 20 μm or more, and that at least some of the compositions are capable of achieving a CS/E ratio of 13.0 in combination with a DOL of 40 μm or more.

While various embodiments have been described herein, they have been presented by way of example, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various situations as would be appreciated by one of skill in the art.

Embodiments of the present disclosure are described in detail herein with reference to embodiments thereof as illustrated in the accompanying drawings, in which like reference numerals are used to indicate identical or functionally similar elements. References to "one embodiment," "an embodiment," "some embodiments," "in certain embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The examples are illustrative, but not limiting, of the present disclosure. Other suitable modifications and adaptations of the variety of conditions and parameters normally encountered in the field, and which would be apparent to those skilled in the art, are within the spirit and scope of the disclosure.

The indefinite articles "a" and "an" to describe an element or component means that one or more than one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

Directional terms as used herein—for example up, down, right, left, front, back, top, bottom, inward, outward—are made only with reference to the figures as drawn and are not intended to imply absolute orientation.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, for example within about 5% of each other, or within about 2% of each other.

It is to be understood that the phraseology or terminology used herein is for the purpose of description and not of limitation. The breadth and scope of the present disclosure should not be limited by any of the above-described exemplary embodiments but should be defined in accordance with the following claims and their equivalents.

The invention claimed is:

1. A glass, comprising:
   greater than or equal to 69.0 mol % to less than or equal to 69.5 mol % $SiO_2$;
   greater than or equal to 10.0 mol % to less than or equal to 10.5 mol % $Al_2O_3$;
   greater than or equal to 4.05 mol % to less than or equal to 5.25 mol % MgO;
   greater than or equal to 0.1 mol % to less than or equal to 1.1 mol % CaO;
   greater than or equal to 14.5 mol % to less than or equal to 15.8 mol % $Na_2O$; and
   greater than or equal to 0.1 mol % to less than or equal to 0.2 mol % $SnO_2$,
   wherein the glass has a liquidus viscosity greater than or equal to 1200 kP to less than or equal to 4000 kP, and
   wherein the glass has a Young's modulus greater than or equal to 71.1 GPa to less than or equal to 72 GPa.

2. The glass of claim 1, wherein the glass is substantially free of $Li_2O$.

3. The glass of claim 1, wherein the glass is substantially free of $K_2O$.

4. The glass of claim 1, wherein the glass is substantially free of ZnO.

5. The glass of claim 1, wherein the glass is substantially free of SrO.

6. The glass of claim 1, wherein the glass is substantially free of BaO.

7. The glass of claim 1, wherein the glass is substantially free of $B_2O_3$.

8. The glass of claim 1, wherein the glass is substantially free of $P_2O_5$.

9. The glass of claim 1, wherein the glass is substantially free of $Fe_2O_3$.

10. The glass of claim 1, wherein the glass comprises:
    greater than or equal to 69.0 mol % to less than or equal to 69.23 mol % $SiO_2$;
    greater than or equal to 10.01 mol % to less than or equal to 10.32 mol % $Al_2O_3$;
    greater than or equal to 4.35 mol % to less than or equal to 5.17 mol % MgO;
    greater than or equal to 0.1 mol % to less than or equal to 1.03 mol % CaO;
    greater than or equal to 14.91 mol % to less than or equal to 15.56 mol % $Na_2O$; and
    greater than or equal to 0.18 mol % to less than or equal to 0.19 mol % $SnO_2$.

11. The glass of claim 1, wherein:
    $Al_2O_3+MgO+CaO \geq 15$ mol %.

12. The glass of claim 1, wherein the glass has a liquidus viscosity greater than or equal to 1200 kP to less than or equal to 3800 kP.

13. The glass of claim 1, wherein the glass has a liquidus temperature greater than or equal to 800° C. to less than or equal to 1000° C.

14. The glass of claim 1, wherein the glass has a Young's modulus greater than or equal to 71.1 GPa to less than or equal to 71.5 GPa.

* * * * *